(12) United States Patent
Kameda et al.

(10) Patent No.: US 10,016,855 B2
(45) Date of Patent: Jul. 10, 2018

(54) METHOD FOR MAKING VALVE DEVICE

(71) Applicant: DENSO CORPORATION, Kariya, Aichi-pref. (JP)

(72) Inventors: Yasutoshi Kameda, Kariya (JP); Osamu Shimane, Kariya (JP)

(73) Assignee: DENSO CORPORATION, Kariya (JP)

( * ) Notice: Subject to any disclaimer, the term of this patent is extended or adjusted under 35 U.S.C. 154(b) by 102 days.

(21) Appl. No.: 15/059,913

(22) Filed: Mar. 3, 2016

(65) Prior Publication Data
US 2016/0265486 A1  Sep. 15, 2016

(30) Foreign Application Priority Data
Mar. 11, 2015  (JP) ................. 2015-048880

(51) Int. Cl.
| | |
|---|---|
| F02M 26/48 | (2016.01) |
| B23P 15/00 | (2006.01) |
| F02M 26/54 | (2016.01) |
| F02M 26/70 | (2016.01) |

(52) U.S. Cl.
CPC .......... *B23P 15/001* (2013.01); *F02M 26/48* (2016.02); *F02M 26/54* (2016.02); *F02M 26/70* (2016.02)

(58) Field of Classification Search
CPC .. F02M 26/48; F02M 2026/001; F02M 26/45; F02M 26/47; F02M 26/57; F02M 26/52; F02M 26/63; Y10T 29/49405; Y10T 29/49412; Y10T 29/49414; Y10T 29/49764; Y10T 29/49776; Y10T 29/49778; Y10T 29/4978; F02C 9/28; F02C 9/16; F02C 9/18; F05D 2270/3015; F05D 2270/306

USPC .......... 137/487.5; 251/129.04, 305
See application file for complete search history.

(56) References Cited

U.S. PATENT DOCUMENTS

| | | | | |
|---|---|---|---|---|
| 5,608,650 A  * | 3/1997 | McClendon | .......... | A61M 5/142 700/282 |
| 6,253,748 B1 * | 7/2001 | Engel | .................. | F02D 41/0072 123/568.16 |
| 6,539,793 B2 * | 4/2003 | Tanimoto | .............. | G01F 1/6842 73/204.15 |
| 2004/0168680 A1 * | 9/2004 | Ishiguro | .............. | F02D 41/0077 123/568.21 |
| 2009/0277519 A1 * | 11/2009 | Parker | .................. | F15B 19/002 137/625.65 |

FOREIGN PATENT DOCUMENTS

JP  2009-2325  1/2009

* cited by examiner

*Primary Examiner* — Jason L Vaughan
*Assistant Examiner* — Amanda Meneghini
(74) *Attorney, Agent, or Firm* — Nixon & Vanderhye PC

(57) ABSTRACT

An opening degree sensor produces a sensor output corresponding to a valve opening degree of a valve, and includes a memory into which the sensor output corresponding to the valve opening degree is written. When performing a first half process, flow rates of more than one valve device are measured, a flow rate error is calculated based on an average flow rate obtained by averaging the measured flow rates, and the sensor output corresponding to the valve opening degree into which the flow rate error is incorporated is obtained. When performing a second half process, the sensor output corresponding to the valve opening degree obtained in the first half process is written into the memory of the valve device whose flow rate is not measured.

6 Claims, 4 Drawing Sheets

METHOD FOR MAKING VALVE DEVICE

CROSS REFERENCE TO RELATED APPLICATION

This application is based on Japanese Patent Application No. 2015-48880 filed on Mar. 11, 2015, the disclosure of which is incorporated herein by reference.

TECHNICAL FIELD

The present disclosure relates to a method for making a valve device that controls a flow rate, and particularly to an art of writing a sensor output corresponding to a valve opening degree.

BACKGROUND

As a specific example for a valve device that controls a flow rate, a conventional technology will be described using an exhaust gas recirculation (EGR) valve (see, e.g., JP2009-002325A). The EGR valve that operates a valve by an actuator includes an opening degree sensor (e.g., angle sensor) as a means for detecting an operation condition (valve opening degree) of the valve by the actuator.

An opening degree sensor provided for the EGR valve is set to produce a "predetermined sensor output" at the time of "a predetermined valve opening degree". To describe an example for assisting the understanding, writing to a memory is carried out to produce the sensor output of 1.2 V when the valve opening degree is fully closed, and the sensor output of 4.0 V when the valve opening degree is fully open, in a production process of the EGR valve. Accordingly, the mechanical "valve opening degree" of the EGR valve and the electrical "sensor output" outputted by the opening degree sensor correspond to each other.

Issues of the conventional technology will be discussed. There is a request to "temporarily" open-control the EGR valve for flow rate adjustment. In recent years, there is a request to "constantly" open-control the EGR valve for flow rate adjustment. In this case (at the time of open-control), the flow rate adjustment is made based on the sensor output from the opening degree sensor, so that a "flow rate obtained from the sensor output (referred to as an operation flow rate)" and an "actual flow rate through the EGR valve (referred to as an actual flow rate)" may correspond to each other.

However, despite the correspondence between the "valve opening degree" and the "sensor output", a flow rate error (deviation of the increase and decrease of the flow rate common to the EGR valves) may be caused due to, for example, the variation (production error) in shape of a component that constitutes the EGR valve. As a result, the "operation flow rate obtained from the sensor output" and the "actual flow rate through the EGR valve" may not correspond to each other. Thus, even though the EGR valve produced by the conventional technology is open-controlled, the flow rate of EGR gas cannot be controlled with high precision.

Although the "issues of the conventional technology" have been described above using the EGR valve, they are not the issues caused only for the EGR valve. Another valve device, such as a valve disposed in a throttle valve or turbocharger, also causes similar issues at the time of open-control.

SUMMARY

The present disclosure addresses at least one of the above issues. Thus, it is an objective of the present disclosure to provide a method for making a valve device that can suppress increase in number of processes and make correspondence between an "operation flow rate obtained from a sensor output" and an "actual flow rate through the valve device".

To achieve the objective of the present disclosure, there is provided a method for making a valve device including: a passage, a valve, and an opening degree sensor. Fluid passes through the passage. The valve makes opening degree adjustment of the passage. The opening degree sensor produces a sensor output corresponding to a valve opening degree of the valve, and includes a memory into which the sensor output corresponding to the valve opening degree is written. According to the method, a first half process is performed, and a second half process is also performed. The valve device is one of more than one valve device. At the time of performing the first half process, flow rates of the more than one valve device are measured, a flow rate error is calculated based on an average flow rate obtained by averaging the measured flow rates, and the sensor output corresponding to the valve opening degree into which the flow rate error is incorporated is obtained. At the time of performing the second half process, the sensor output corresponding to the valve opening degree obtained in the first half process is written into the memory of the valve device whose flow rate is not measured.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments will be described.

A specific example (embodiment) of application of the present disclosure to an "EGR valve of an exhaust gas recirculation device (EGR device)" will be explained below. The embodiment discloses a specific example, and it goes without saying that the present disclosure is not limited to the embodiment.

First Embodiment

A first embodiment will be described in reference to FIGS. 1 to 4. The EGR valve adjusts an opening degree of an EGR passage 1 for returning a part of exhaust gas discharged by an engine (internal-combustion engine) to an intake passage of the engine as EGR gas. This EGR valve is controlled by an (engine control unit) ECU.

Figure 1:
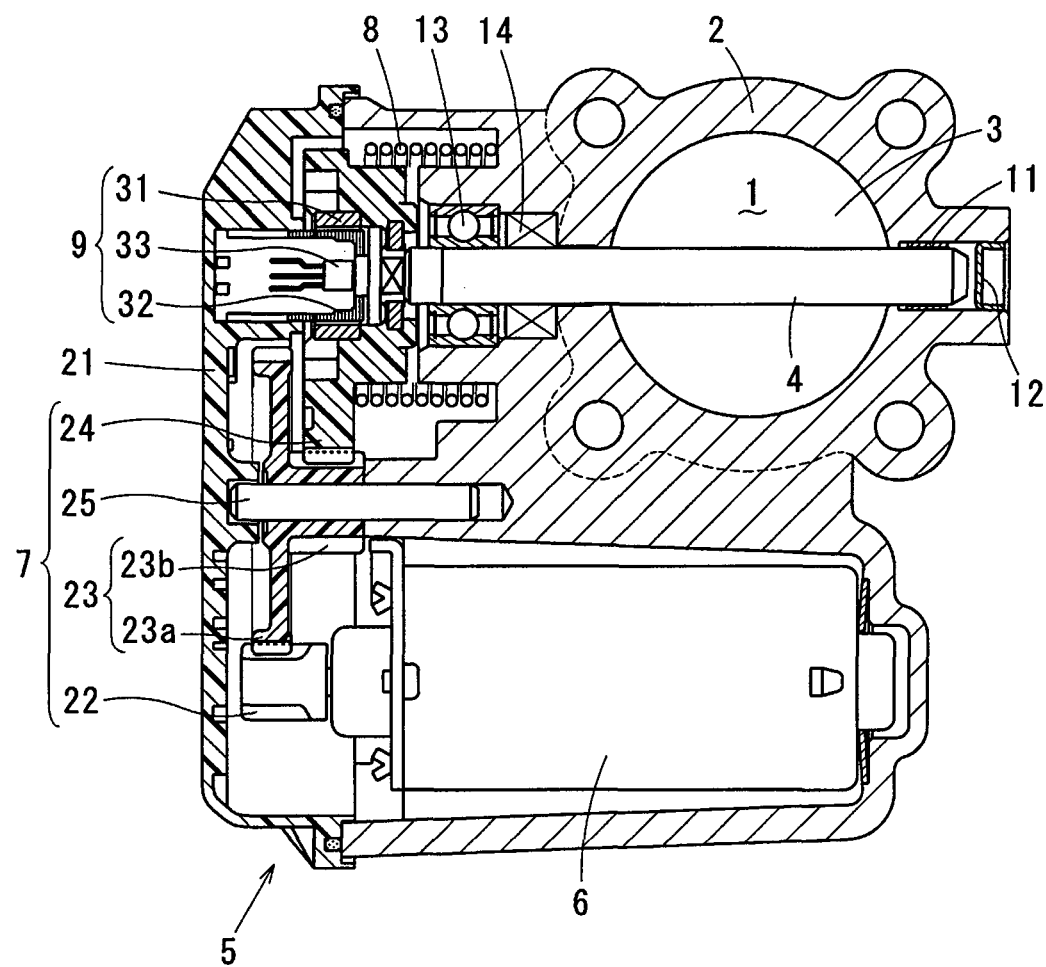
FIG. 1 is a sectional view illustrating an EGR valve in accordance with a first embodiment.

The EGR valve may be used for a high-pressure EGR system that returns EGR gas from a high exhaust pressure generating range (upstream of a turbocharger) in an exhaust passage to the intake passage, or may be used for a low-pressure EGR system that returns EGR gas from a low exhaust pressure generating range (downstream side of a catalyst or particulate filter in an exhaust gas flow direction) in the exhaust passage to the intake passage. As an example, FIG. 1 illustrates an EGR valve used for the low-pressure EGR system.

The EGR valve includes a housing 2 that defines therein a part of the EGR passage 1, a valve 3 that is disposed in the EGR passage 1, a shaft 4 that supports this valve 3, and an electric actuator 5 that gives rotation force to this shaft 4.

The electric actuator 5 includes an electric motor 6 that generates the rotation force upon energization thereof, a deceleration device 7 that amplifies a rotation output of this electric motor 6 to drive the shaft 4, a return spring 8 that returns the shaft 4 (valve 3) to its initial position (fully closed position), and an opening degree sensor 9 that detects an opening degree of the valve 3.

The above-described components will be explained below. The housing 2 is made of a metallic material or a resin material excellent in heat resistance. An inner wall (bore) of the EGR passage 1 having a cylindrical shape is formed in this housing 2, and a bolt inserting hole for fixing the EGR valve to a vehicle is provided at a bore end.

The housing 2 includes a shaft inserting hole through which the shaft 4 is inserted and disposed. The shaft 4 passes across the EGR passage 1 in a right and left direction in FIG. 1, and is attached to the housing 2 in a direction perpendicular to a streamline direction (bore axis) of the EGR passage 1. A bearing 11 that rotatably supports the shaft 4 is disposed in the part of the shaft inserting hole through which the end of the shaft 4 (right side in FIG. 1) is inserted and disposed. A sealing plug 12 for sealing the end of the shaft inserting hole is fixed to the end of the shaft inserting hole (right end in FIG. 1).

Similarly, a bearing 13 (rolling bearing as an example) that rotatably supports the shaft 4 is also disposed in the part of the shaft inserting hole through which a root side of the shaft 4 (left side in FIG. 1) is inserted and disposed. A seal material 14 for sealing a clearance between the housing 2 and the shaft 4 is disposed in the shaft inserting hole between this bearing 13 and the EGR passage 1.

The shaft 4 is a cylindrical rod that is formed from a metallic material (e.g., iron, stainless steel), and is supported rotatably by the housing 2 as described above. On the other hand, the valve 3 is a butterfly-type rotation valve that is formed in a generally disk shape from a metallic material (e.g., aluminum, brass), and is fixed to the shaft 4 in the EGR passage 1. The art of joining of the valve 3 and the shaft 4 is not limited, and the valve 3 and the shaft 4 are joined together, for example, by a welding technique, or screw-fastening technique or crimping technique. Although a seal ring-less type that does not use a separate seal ring at an outer peripheral edge of the valve 3 is disclosed in FIG. 1, this is, needless to say, not limiting.

The electric actuator 5 is attached to the above-described housing 2, and a gear cover 21, which can be attached and removed by a screw or the like, is attached to the housing 2. The electric motor 6 is accommodated in a motor accommodating chamber that is formed in the housing 2. The deceleration device 7, the return spring 8, and so forth are accommodated in a space formed between the housing 2 and the gear cover 21.

The electric motor 6 is a widely-known direct current motor that has its rotation direction switched by the switch of the energizing direction and that generates rotation torque in accordance with the energizing amount. The electric motor 6 is inserted into the motor accommodating chamber, and is then fixed to the housing 2 by a screw or the like.

The deceleration device 7 is a gear-type speed reducer that decelerates the rotation generated by the electric motor 6 through combination of gears and that increases driving torque to transmit the torque to the shaft 4. The deceleration device 7 includes a motor gear (pinion gear) 22 that rotates integrally with the electric motor 6, an intermediate gear 23 that is rotated by this motor gear 22, and a final gear (gear rotor) 24 that is rotated by this intermediate gear 23. The final gear 24 rotates integrally with the shaft 4.

The motor gear 22 is an external gear having a small diameter that is fixed to an output shaft of the electric motor 6. The intermediate gear 23 is a double gear including a large-diameter gear 23a and a small-diameter gear 23b which are provided concentrically with each other. The intermediate gear 23 is supported rotatably by a supporting shaft 25 which is supported by the housing 2 and the gear cover 21. The large-diameter gear 23a is constantly engaged with the motor gear 22, and the small-diameter gear 23b is constantly engaged with the final gear 24. The final gear 24 is an external gear having a large diameter that is fixed to the end portion of the shaft 4, and its engaging teeth (external teeth) are provided only in a range that is in accordance with the rotation of the valve 3.

When an electric current supplied to the electric motor 6 is interrupted, the return spring 8 returns the opening degree of the valve 3 to its fully closed position. A specific example of the return spring 8 is a single coil spring that is wound only in one direction, and is disposed around the shaft 4 concentrically with the shaft 4 as illustrated in FIG. 1.

The opening degree sensor 9 of this embodiment is an angle sensor that detects a rotation angle of the shaft 4 to detect the opening degree of the valve 3, and gives a sensor output (voltage output) in accordance with the rotation angle detected by the opening degree sensor 9 to the ECU.

This opening degree sensor 9 is a magnetic-type rotation opening degree sensor 9 that contactlessly detects a relative rotation between two members. The opening degree sensor 9 is configured to include a magnetic flux generating means 31 having a generally cylindrical shape that is inserted in the final gear 24 to rotate integrally with the shaft 4, a magnetic detection core 32 that is attached to the gear cover 21 to converge the magnetic flux given from the magnetic flux generating means 31 on its generally central part, and a Hall IC (memory) 33 that is attached to the magnetic detection core 32 to generate a sensor output in accordance with the density of magnetic flux passing through the generally central part of the magnetic detection core 32.

The Hall IC 33 includes a Hall element that outputs a detection signal in accordance with the density of the passing magnetic flux (i.e., signal in accordance with a rotation angle of the magnetic flux generating means 31), a memory (e.g., rewritable ROM such as an EEPROM) into which a "sensor output corresponding to the detected opening degree" is written, and an amplifying circuit that generates the output signal from the Hall element as the sensor output (voltage output) according to the valve opening degree based on the data written in the memory. The above configuration is obviously a specific example, and the memory and the amplifying circuit may be provided separately from the Hall IC 33.

The background art for the first embodiment will be described below. The ECU is a widely known electronic control unit including a microcomputer, and open-controls the EGR valve "constantly" or "temporarily" to control the amount of EGR gas returned to the engine. In this case (at the time of open-control), the ECU controls the EGR gas amount based on the sensor output outputted from the opening degree sensor 9.

To highly accurately control the EGR gas amount at the time of open-control, an "operation flow rate obtained from the sensor output" that is obtained from the sensor output, and an "actual flow rate" of gas that actually flows through the EGR valve may correspond to each other. However, an "error in flow rate" may be caused due to, for example, the shape of the component that constitutes the EGR valve. Accordingly, the "operation flow rate obtained from the sensor output" and the "actual flow rate" do not correspond to each other, so that the flow rate of EGR gas cannot be controlled with high precision by the open-control.

In this first embodiment, using occurrence of a "flow rate error" common to more than one EGR valve produced, correspondence is made between the "operation flow rate obtained from the sensor output" and the "actual flow rate" of gas actually flowing through the EGR valve.

The method for making the EGR valve will be described below. As described above, the EGR valve (which is an example of a valve device) of this first embodiment includes the valve 3 that adjusts an opening degree of the EGR passage 1 (which is an example of a passage), and the opening degree sensor 9 that produces the sensor output corresponding to the opening degree of this valve 3. The opening degree sensor 9 includes the memory into which the "sensor output corresponding to the valve opening degree" is written.

In a production process of the EGR valve, there are executed (a) a first half process, where: the flow rates of more than one EGR valve are measured; the flow rate error is calculated based on an average flow rate obtained by averaging the measured flow rates; and the "sensor output corresponding to the valve opening degree (written-in data after correction)", in which this flow rate error is incorporated, is obtained, and (b) a second half process, where: the "written-in data after correction" obtained in the first half process is written into the memory of the EGR valve in which data is not written into the memory and whose flow rate is not measured (i.e., EGR valve in which data is subsequently written into the memory).

In the specific first half process, there are executed (a1) an average flow rate calculation process where flow rate measurement is carried out with more than one EGR valve in which the "sensor output corresponding to the valve opening degree" is written into their each memory, to calculate the "average flow rate (i.e., averaged actual flow rate", and (a2) a matching process where three pieces of information: the average flow rate, the sensor output, and the valve opening degree are matched together.

In the specific matching process, the "sensor output corresponding to the valve opening degree" that can make correspondence between the "operation flow rate obtained from the sensor output" and the "actual flow rate" is obtained using a relationship (see FIG. 3) between the "flow rate and valve opening degree" without errors and the "flow rate error" obtained through measurement, or a relationship between the "flow rate and sensor output" without errors and the "flow rate error" obtained through measurement.

The specific example of the first half process will be described below. As described above, the first half process is a process in which: the flow rates of more than one EGR valve are measured; the "average flow rate error of the EGR valves" is recognized in advance based on the average flow values"; the three pieces of information of the "average flow rate", the "sensor output", and the "valve opening degree" are matched together; and the "sensor output corresponding to the valve opening degree" which is a "sensor output corresponding to the flow rate" is obtained.

Figure 2A:
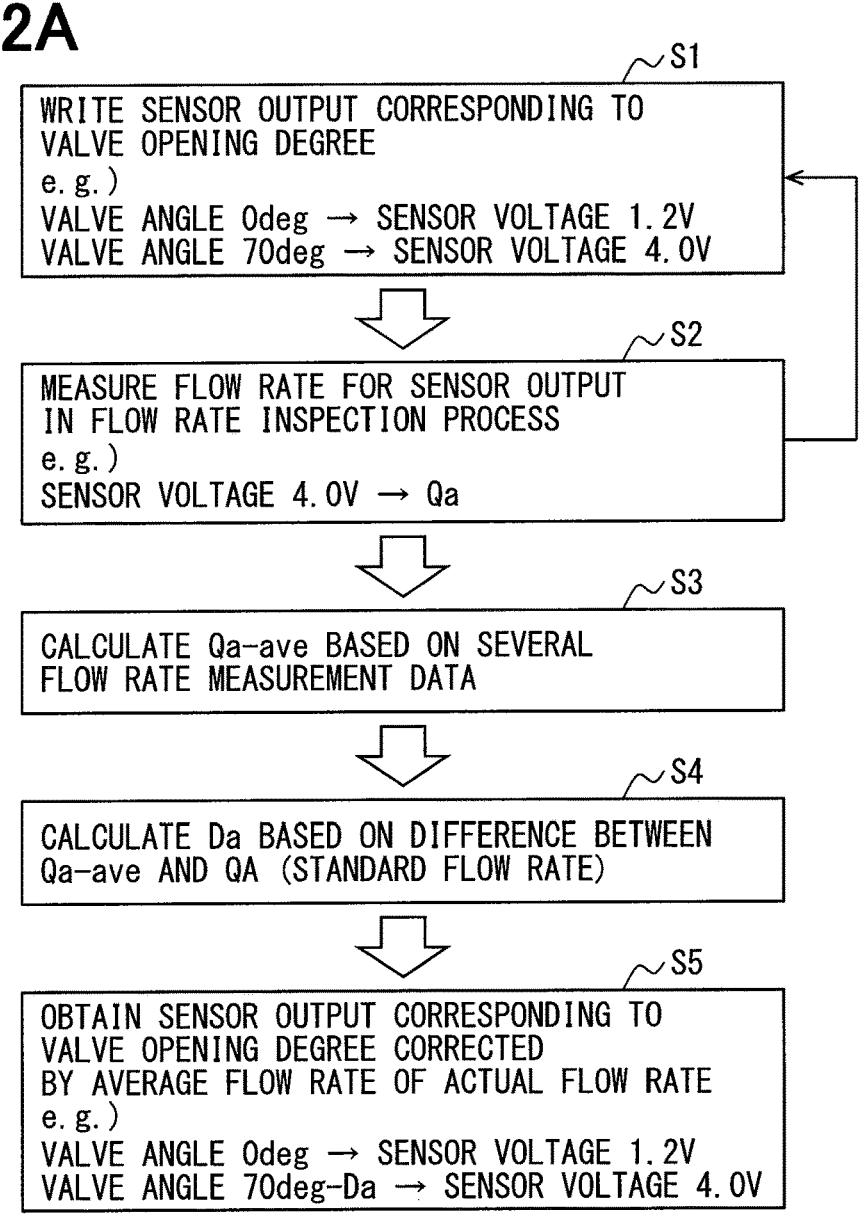
FIG. 2A is a flowchart showing a production process which illustrates a specific example of a first half process in the first embodiment.

The specific example of the first half process will be explained with reference to FIG. 2A. In the specific example illustrated below, the "valve opening degree is a valve angle" and the "sensor output is a sensor voltage". Step S1: the "sensor output corresponding to the valve opening degree" is written into the memory. As an example, data (e.g., six-dimensional polynomial) with 1.2 V at the time of the valve angle being 0 degrees (valve opening degree is fully closed: 0% of the opening degree), and with 4.0 V at the time of the valve angle being 70 degrees (valve opening degree is fully open: 100% of the opening degree) is written into the memory.

Step S2: the flow rate is measured using the EGR valve in which the data is written into its memory at the above Step S1 to obtain the actual flow rate for the sensor output. As an example, an actual flow rate Qa at the time of the sensor output being 4.0 V (fully open) is measured.

Step S3: the above Steps S1, S2 are repeatedly performed using more than one EGR valve to calculate the average flow rate obtained by averaging the actual flow rates. The average flow rate of the actual flow rates for the valve opening degree is indicated by a continuous line A in FIG. 3. As an example, the average flow rate Qa-ave of the actual flow rates Qa is calculated. Although the number of EGR valves with which to perform the flow rate measurement is not limiting, using the more EGR valves may be more desirable in terms of accuracy.

Step S4: a comparison is made between the "average flow rate of the actual flow rates for the valve opening degrees (see the continuous line A in FIG. 3)" and a "design flow rate without an error for the valve opening degree (see a continuous line B in FIG. 3)", and a correction opening degree is calculated based on a flow rate difference (flow rate error) therebetween. Specifically, when the EGR valve does not have a flow rate error, a difference is not made between a nominal opening degree (design opening degree of the EGR valve) and an actual opening degree (actual opening degree of the EGR valve) as indicated by a short dashes line C in FIG. 4. On the other hand, when the EGR valve has a flow rate error, an error is caused in the actual opening degree (actual opening degree of the EGR valve) relative to the nominal opening degree as indicated by a continuous line D in FIG. 4. Accordingly, the correction opening degree obtained by correcting the flow rate error is found based on a difference between the nominal opening degree and the actual opening degree (nominal opening degree–actual opening degree). As an example, a correction angle Da at 70 degrees of the valve angle (valve opening degree is fully open) is obtained.

Step S5: the correction opening degree obtained at the above Step S4 is incorporated into the valve opening degree. Then, the "sensor output corresponding to the valve opening degree" into which the correction opening degree is incorporated (written-in data after correction by a polynomial or the like) is obtained. As an example, the "written-in data after correction" with 1.2 V at the time of the valve angle being 0 degrees (valve opening degree is fully closed: 0% of the opening degree), and with 4.0 V at the time of "valve angle 70°–correction angle Da" is obtained. This completes the first half process.

Figure 2B:
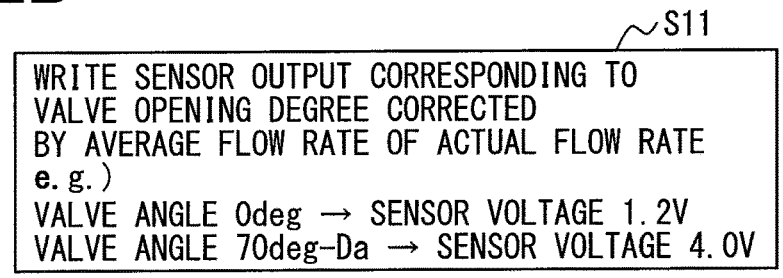
FIG. 2B is a flowchart showing the production process which illustrates a specific example of a second half process in the first embodiment.
Figure 3:
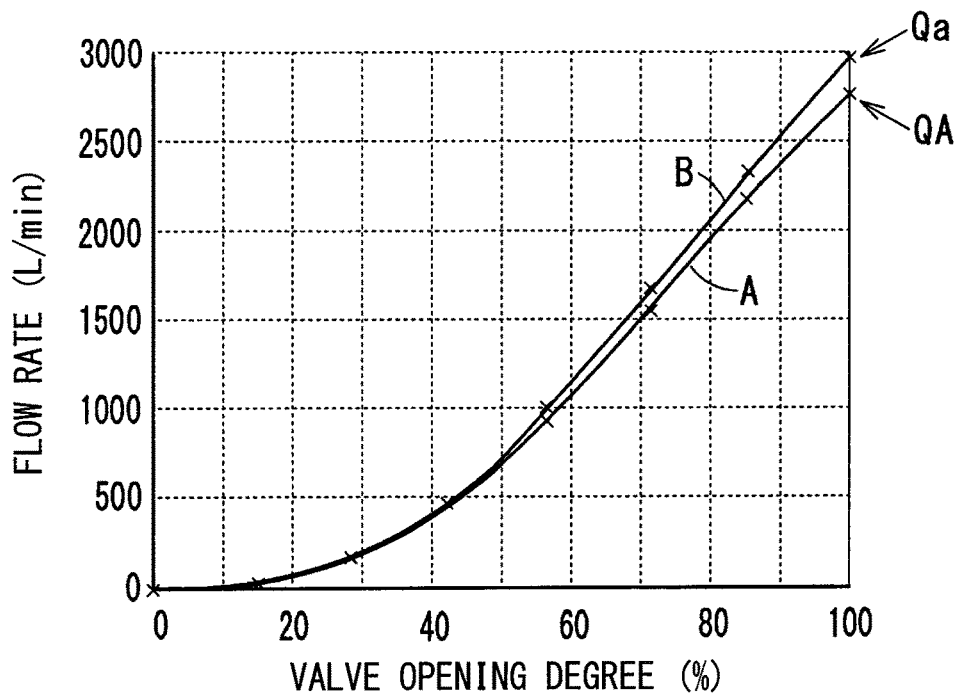
FIG. 3 is a graph illustrating a relationship between a valve opening degree and a flow rate in the first embodiment.
Figure 4:
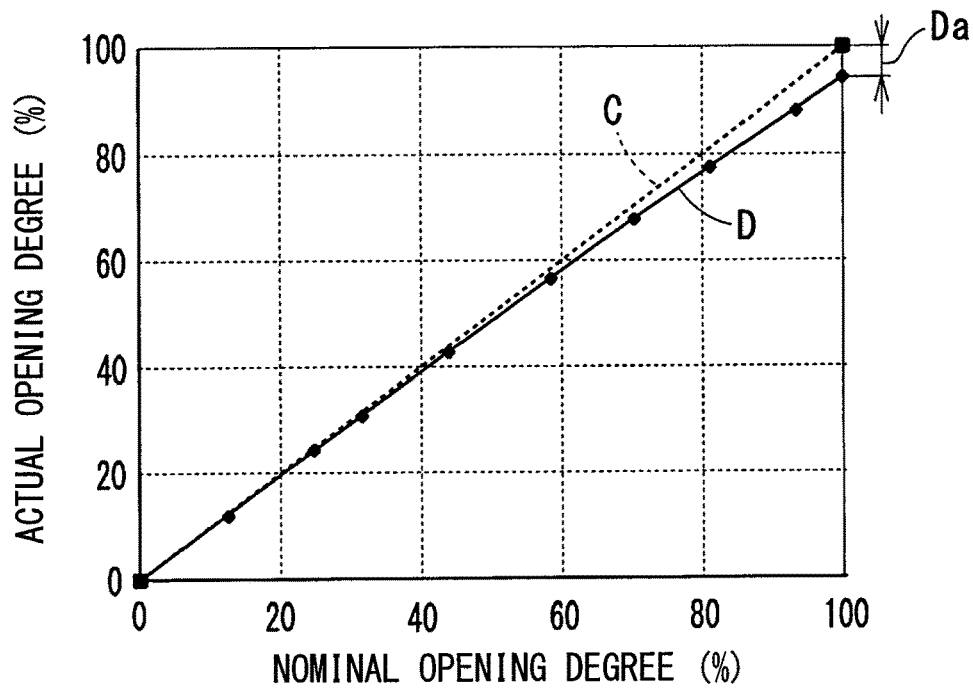
FIG. 4 is a graph illustrating a relationship between a nominal opening degree and an actual opening degree in the first embodiment.

A specific example of the second half process will be described with reference to FIG. 2B. Step S11: the "sensor output corresponding to the valve opening degree (written-in data after correction)" obtained in the first half process is written into the memory. This single process completes the second half process.

A first effect of the first embodiment will be described below. According to the method for making the EGR valve of this first embodiment, the flow rate error is calculated from more than one previously-produced EGR valve, and the "sensor output corresponding to the valve opening degree (written-in data after correction)" into which this flow rate error is incorporated is obtained (first half process). The "written-in data after correction" obtained in the first half process is written into a memory of another subsequently-produced EGR valve (second half process). Thus, the number of production processes of the EGR valve can be reduced.

According to the method for making the EGR valve of this first embodiment, the "written-in data after correction" is obtained using the average flow rate of more than one EGR valve. As a result, influence of a differential pressure variation caused during each individual flow rate measurement can be restrained. Thus, a defect such as variation in "written-in data after correction" due to the influence of the differential pressure variation caused during flow rate measurement can be avoided, and highly accurate correspondence can thereby be made between the "operation flow rate" and the "actual flow rate".

As described above, the method for making the EGR valve of this first embodiment can make correspondence between the "operation flow rate obtained from the sensor output" and the "actual flow rate of EGR gas flowing through the EGR valve", with the number of production processes reduced. Accordingly, even when open-controlling the EGR valve, the "operation flow rate" and the "actual flow rate" correspond to each other. Thus, the flow rate of EGR gas can be controlled with high precision. In addition, the reduction in number of production processes can suppress the cost of the EGR valve, to which a flow rate correction is made.

A second effect of the first embodiment will be described below. In the first half process of this first embodiment, the flow rate measurement is carried out at more than one valve opening degree, i.e., the flow rate measurement is performed at two or more valve opening degrees. In this manner, making the flow rate measurement at more than one valve opening degree can improve the measurement accuracy of the "flow rate error". Thus, correspondence can be made between the "operation flow rate" and the "actual flow rate" in a wide opening degree range.

Specifically, the flow rate measurement is made with at least two valve opening degrees of the fully closed position and fully open position included. In this manner, making the flow rate measurement at two or more opening degrees including the fully closed position and fully open position can make correspondence between the "operation flow rate" and the "actual flow rate" in a wide opening degree range from a low opening degree to a high opening degree. Additionally, in the case of flow rate measurement at each of many valve opening degrees, i.e., in the case of flow rate measurement at opening degrees of many positions, the measuring point increases in number. Thus, the precision of correspondence between the "operation flow rate" and the "actual flow rate" can be improved.

Second Embodiment

Figure 5:
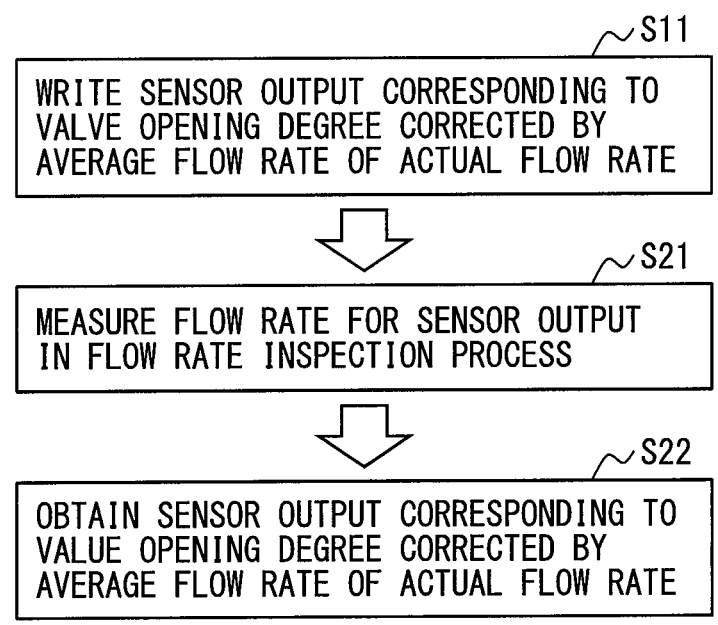
FIG. 5 is a flowchart illustrating a production process in accordance with a second embodiment.

A second embodiment will be described with reference to FIG. 5. In the following embodiments, the same numerals as in the above first embodiment indicate their corresponding functional objects. In the above first embodiment, the "first half process" and the "second half process" have been explained independently for the purpose of facilitating understanding. On the other hand, this second embodiment repeats reflecting the flow rate of the EGR valve that has completed the "second half process" in the "first half process" for the subsequent EGR valve.

Specifically, in this second embodiment, the flow rate of the EGR valve that has completed writing the data into the memory in the "second half process" is measured, and the flow rate obtained by this flow rate measurement is reflected in the "sensor output corresponding to the valve opening degree" used for writing the data into the memory for a subsequent EGR valve device. More specifically, each time the measurement of the flow rate of the EGR valve that has completed writing the data into the memory (flow rate inspection for the product inspection in this embodiment) is carried out, the second embodiment increases the number of samples for calculating the average flow rate (i.e., number of samples for the flow rates used when calculating the average flow rate).

A specific example will be described with reference to FIG. 5. Step S11: as explained in the above first embodiment, the second half process is executed to write the "sensor output corresponding to the valve opening degree (written-in data after correction)" into the memory. Step S21: the flow rate of the EGR valve that has completed writing the data into the memory is inspected. Step S22: the flow rate measured by the flow rate inspection is added to the flow rates which have been measured so far, to calculate the average flow rate. Then, the "sensor output corresponding to the valve opening degree" into which the flow rate error of the EGR valve is incorporated is obtained by the method described in the first half process of the above first embodiment. This completes the first half process used for writing the data into the memory for the subsequent EGR valve.

In this manner, the number of samples for the flow rate to be measured can be increased each time the EGR valve is produced. Accordingly, the accuracy of correspondence between the "operation flow rate" and the "actual flow rate" can be improved each time the EGR valve is produced. In addition, although this second embodiment measures the flow rate of the EGR valve that has completed writing the data into the memory, the flow rate measurement for product inspection of the produced EGR valve is utilized. Consequently, the increase in number of production processes is restricted. Thus, the method for making the EGR valve in this second embodiment can improve the precision of correspondence between the "operation flow rate" and the "actual flow rate" with the number of production processes limited.

Third Embodiment

A third embodiment will be described below. With respect to more than one EGR valve used in the "first half process" of the above first embodiment (more than one initial EGR valve for which the flow rate is measured to obtain "written-in data after correction"), "uncorrected data (see Step S1)" is written into their memories. After that, the above-described Step S11 is not performed.

Accordingly, this third embodiment performs the above Step S11 also on more than one EGR valve used in the "first half process" of the first embodiment to write the "written-in data after correction" into the memory of the opening degree sensor 9. Thus, this third embodiment overwrites the "written-in data after correction" into the memory of the EGR valve (memory of the EGR valve used in Steps S1 to S5) into which the "uncorrected written-in data" is written.

As described above, in this third embodiment, by overwriting the "written-in data after correction" into the memories of more than one EGR valve used in the "first half process" of the first embodiment, highly accurate correspondence can be made between the "operation flow rate" and the "actual flow rate" even for "more than one initial EGR valve".

Industrial applicability of the present disclosure will be described below. In the above embodiments, the examples of application of the present disclosure to the EGR valve have been illustrated, but the disclosure is not limited to the examples. Thus, the present disclosure may be applied to various valve devices that make flow rate adjustment by the open-control.

The above embodiments illustrate that an angle sensor is used as a specific example of the opening degree sensor, but the present disclosure is not limited to this example. As a specific example, the present disclosure may be applied to a valve device including a slide sensor if the valve 3 is slide-operated. Thus, the sensor output of the slide sensor may be corrected using the present disclosure.

Characteristics of the method for making the valve device of the above embodiments can be described as follows.

According to the method for making the valve device of the present disclosure, the flow rate error is obtained using more than one previously-produced valve device, and the "sensor output corresponding to the valve opening degree (referred to as written-in data after correction)" into which this flow rate error is incorporated is obtained (first half process). The "written-in data after correction" obtained in this first half process is written into a memory of another subsequently-produced valve device (valve device whose flow rate is not measured) (second half process). Accordingly, the number of processes can be limited. Moreover, according to the method for making the valve device of the present disclosure, the "written-in data after correction" is obtained using the average flow rate of more than one valve device. As a result, influence of a differential pressure variation caused during each individual flow rate measurement can be restrained. Thus, a defect such as variation in "written-in data after correction" due to the influence of the differential pressure variation caused during flow rate measurement can be avoided, and highly accurate correspondence can thereby be made between the "operation flow rate" and the "actual flow rate". In this manner, the method for making the valve device of the present disclosure can suppress increase in number of processes and make correspondence between the "operation flow rate obtained from the sensor output" and the "actual flow rate through the valve device".

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A method for making a valve device including:
   a passage through which fluid passes;
   a valve that makes opening degree adjustment of the passage; and
   an opening degree sensor that produces a sensor output corresponding to a valve opening degree of the valve and that includes a memory into which the sensor output corresponding to the valve opening degree is written, the method comprising:
   performing a first process, wherein:
   the valve device is one of a predetermined number of valve devices; and
   the performing of the first process includes:
      measuring flow rates of the predetermined number of valve devices;
      calculating a flow rate error based on an average flow rate obtained by averaging the measured flow rates; and
      obtaining the sensor output corresponding to the valve opening degree into which the flow rate error is incorporated; and
   performing a second process after the first process has been performed, wherein the performing of the second process includes writing the sensor output corresponding to the valve opening degree obtained in the first process into the memory of another subsequently-produced valve device whose flow rate is not measured; and
   wherein the predetermined number is more than one.

2. The method according to claim 1, further comprising:
   measuring a flow rate of the valve device that has completed writing the sensor output into the memory in the second process; and
   reflecting the measured flow rate in the sensor output corresponding to the valve opening degree used for writing the sensor output into the memory of the subsequently-produced valve device.

3. The method according to claim 1, wherein the first process includes:
   an average flow rate calculation process, whereby flow rate measurement is performed with the predetermined number of valve devices, with the sensor output corresponding to the valve opening degree written into memories of the predetermined number of valve devices, to calculate the average flow rate; and
   a matching process, whereby the average flow rate, the sensor output from the opening degree sensor, and the valve opening degree of the valve are matched together.

4. The method according to claim 1, wherein the performing of the first process includes performing the flow rate measurement at a plurality of valve opening degrees.

5. The method according to claim 4, wherein the performing of the first process includes performing the flow rate measurement at least when the valve opening degree is fully closed and fully open.

6. The method according to claim 1, wherein the valve device is an exhaust gas recirculation (EGR) valve that adjusts an opening degree of an EGR passage for returning a part of exhaust gas discharged from an engine to an intake passage of the engine as EGR gas.

* * * * *